US010650777B2

(12) United States Patent
Hwang et al.

(10) Patent No.: US 10,650,777 B2
(45) Date of Patent: May 12, 2020

(54) DISPLAY DEVICE HAVING AN INACTIVE MODE

(71) Applicant: Samsung Display Co., Ltd., Yongin-si, Gyeonggi-do (KR)

(72) Inventors: Yong-sik Hwang, Yongin-si (KR); Sanghyun Park, Cheonan-si (KR); Kyungmo Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/460,803

(22) Filed: Jul. 2, 2019

(65) Prior Publication Data

US 2019/0325841 A1 Oct. 24, 2019

Related U.S. Application Data

(63) Continuation of application No. 15/490,151, filed on Apr. 18, 2017, now Pat. No. 10,373,580.

(30) Foreign Application Priority Data

May 27, 2016 (KR) ........................ 10-2016-0065912

(51) Int. Cl.
*G06F 3/038* (2013.01)
*G09G 5/00* (2006.01)
(Continued)

(52) U.S. Cl.
CPC ............... *G09G 5/003* (2013.01); *G09G 3/20* (2013.01); *G09G 3/3648* (2013.01); *G09G 3/3696* (2013.01); *G09G 2230/00* (2013.01); *G09G 2310/08* (2013.01); *G09G 2330/02* (2013.01); *G09G 2330/021* (2013.01); *G09G 2330/027* (2013.01); *G09G 2330/028* (2013.01); *G09G 2330/04* (2013.01)

(58) Field of Classification Search
CPC ........ G09G 5/003; G09G 3/20; G09G 3/3648; G09G 3/3696
USPC .......................................................... 345/211
See application file for complete search history.

(56) References Cited

U.S. PATENT DOCUMENTS

2001/0030645 A1 10/2001 Tsutsui et al.
2006/0006850 A1* 1/2006 Inoue .................... H02J 7/0065 323/265

(Continued)

FOREIGN PATENT DOCUMENTS

KR 10-0283516 B1 3/2001
KR 10-2008-0061210 A 7/2008

(Continued)

*Primary Examiner* — Jonathan M Blancha
(74) *Attorney, Agent, or Firm* — Lewis Roca Rothgerber Christie LLP

(57) ABSTRACT

A display device includes a power generator to supply a driving voltage to the display and a controller to control the display and the power generator and to generate a power control signal. The power generator includes a DC-DC converter and bypass cut-off logic. The DC-DC converter receives an input power voltage and the power control signal, selectively boosts the input power voltage based on the power control signal, and generates the driving voltage. The bypass cut-off logic selectively cuts off supply of the input power voltage to the DC-DC converter based on the power control signal.

6 Claims, 5 Drawing Sheets

(51) Int. Cl.

| | |
|---|---|
| ***G09G 3/20*** | (2006.01) |
| *G09G 3/36* | (2006.01) |

(56) References Cited

U.S. PATENT DOCUMENTS

| | | | |
|---|---|---|---|
| 2008/0238372 | A1 | 10/2008 | Cintra et al. |
| 2012/0133634 | A1 | 5/2012 | Her et al. |
| 2015/0206502 | A1 | 7/2015 | Hwang et al. |
| 2016/0013769 | A1 | 1/2016 | Lee et al. |

FOREIGN PATENT DOCUMENTS

| | | | |
|---|---|---|---|
| KR | 10-2009-0005861 | A | 1/2009 |
| KR | 10-2015-0022295 | A | 3/2015 |
| KR | 10-1611387 | B1 | 4/2016 |

* cited by examiner

DISPLAY DEVICE HAVING AN INACTIVE MODE

CROSS-REFERENCE TO RELATED APPLICATION

This application is a continuation of U.S. patent application Ser. No. 15/490,151, filed Apr. 18, 2017, which claims priority to and the benefit of Korean Patent Application No. 10-2016-0065912, filed on May 27, 2016, the entire content of which is incorporated herein by reference.

BACKGROUND

1. Field

One or more embodiments described herein relate to a display device.

2. Description of the Related Art

One type of display device includes gate lines, data lines, pixels, and switching elements connected to respective ones of the pixel electrodes. The display device may also include an AC-DC converter and a DC-DC converter. The AC-DC converter converts AC power to DC power. The DC-DC converter converts the DC power to a driving voltage for driving the pixels.

SUMMARY

In accordance with one or more embodiments, a display device includes a display to display an image; a power generator to supply a driving voltage to the display; and a controller to control the display and the power generator and to generate a power control signal, wherein the power generator includes: a DC-DC converter to receive an input power voltage and the power control signal, selectively boost the input power voltage based on the power control signal, and generate the driving voltage; and bypass cut-off logic to selectively cut-off supply of the input power voltage to the DC-DC converter based on the power control signal.

The DC-DC converter may perform boosting in an active section and hold boosting in an inactive section, and the bypass cut-off logic may cut off supply of the input power voltage in the inactive section and supply the input power voltage in the active section. The driving voltage may have an off level in the inactive section, and the off level may be less than a level of a predetermined shut down voltage. The off level may be a ground level.

The power generator may include a common voltage generator to receive the driving voltage and convert the driving voltage into a common voltage, and the common voltage generator may be turned off in the inactive section. The common voltage generator may include an OP-AMP to receive the driving voltage as power. The power control signal may have a first logic level in the inactive section; the DC-DC converter may hold boosting based on the first logic level; the bypass cut-off logic may cut off supply of the input power voltage based on the first logic level; and the common voltage generator may be turned off based on the first logic level.

The DC-DC converter may output a voltage having an off level lower than a level of a predetermined shut down voltage as the driving voltage based on the first logic level. The power control signal may have a second logic level in the active section; the DC-DC converter may boost based on the second logic level; the bypass cut-off logic may supply the input power voltage based on the second logic level; and the common voltage generator may be turned on based on the second logic level.

The bypass cut-off logic may include a bypass controller to receive the power control signal and the input power voltage and generate a cut-off control signal based on the power control signal; and a bypass cut-off transistor including an input terminal may receive the input power voltage and a control terminal may receive the cut-off control signal, the bypass cut-off transistor may cut off supply of the input power voltage provided to the DC-DC converter based on the cut-off control signal.

The DC-DC converter may include an inductor having a first terminal coupled to an output terminal of the bypass cut-off transistor. The DC-DC converter may include a diode coupled to a second terminal of the inductor, a switching transistor coupled to the second terminal of the inductor, and a boosting controller, and the boosting controller may receive the power control signal in the active section and generate a pulse based on the power control signal to output the pulse to a control terminal of the switching transistor. The boosting controller may receive the power control signal in the inactive section and to turn off the switching transistor based on the power control signal.

The bypass controller may generate the input power voltage as the cut-off control signal in the inactive section and apply a voltage having a gate-on level to turn on the bypass cut-off transistor as the cut-off control signal to the control terminal of the bypass cut-off transistor in the active section.

In accordance with one or more other embodiments, a display device includes a display to display an image; a power generator to supply a driving voltage to the display; and a controller to control the display and the power generator and generate a power control signal, wherein the power generator includes: a DC-DC converter to receive an input power voltage and the power control signal and boost the input power voltage during an active section based on the power control signal to generate the driving voltage, and output the input power voltage during an inactive section; a common voltage generator to receive the driving voltage and convert the driving voltage into a common voltage; and bypass cut-off logic to cut off a supply of the input power voltage provided to the common voltage generator based on the power control signal.

The bypass cut-off logic may supply the driving voltage to the common voltage generator in the active section. The power control signal may have a first logic level during the inactive section; the DC-DC converter is to hold boosting and output the input power voltage based on the first logic level; the bypass cut-off logic is to cut off supply of the input power voltage based on the first logic level; the common voltage generator is to be turned off based on the first logic level; the power control signal has a second logic level during the active section; the DC-DC converter is to boost based on the second logic level; the bypass cut-off logic is to supply the driving power voltage based on the second logic level; and the common voltage generator is to be turned on based on the second logic level.

The bypass cut-off logic may include a bypass controller to receive the power control signal and the input power voltage and generate a cut-off control signal based on the power control signal; and a bypass cut-off transistor including an input terminal coupled to the DC-DC converter and a control terminal to receive the cut-off control signal, the bypass cut-off transistor is to cut off supply of the input power voltage or supply the driving voltage based on the cut-off control signal.

The DC-DC converter may include an inductor having a first terminal to receive the input power voltage, a diode having a first terminal connected to a second terminal of the inductor, a switching transistor connected to the second terminal of the inductor, and a boosting controller to control the switching transistor, the input terminal of the bypass cut-off transistor is coupled to a second terminal of the diode, and the boosting controller is to generate a pulse based on the power control signal in the active section to output the pulse to a control terminal of the switching transistor. The boosting controller may turn off the switching transistor in the inactive section.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
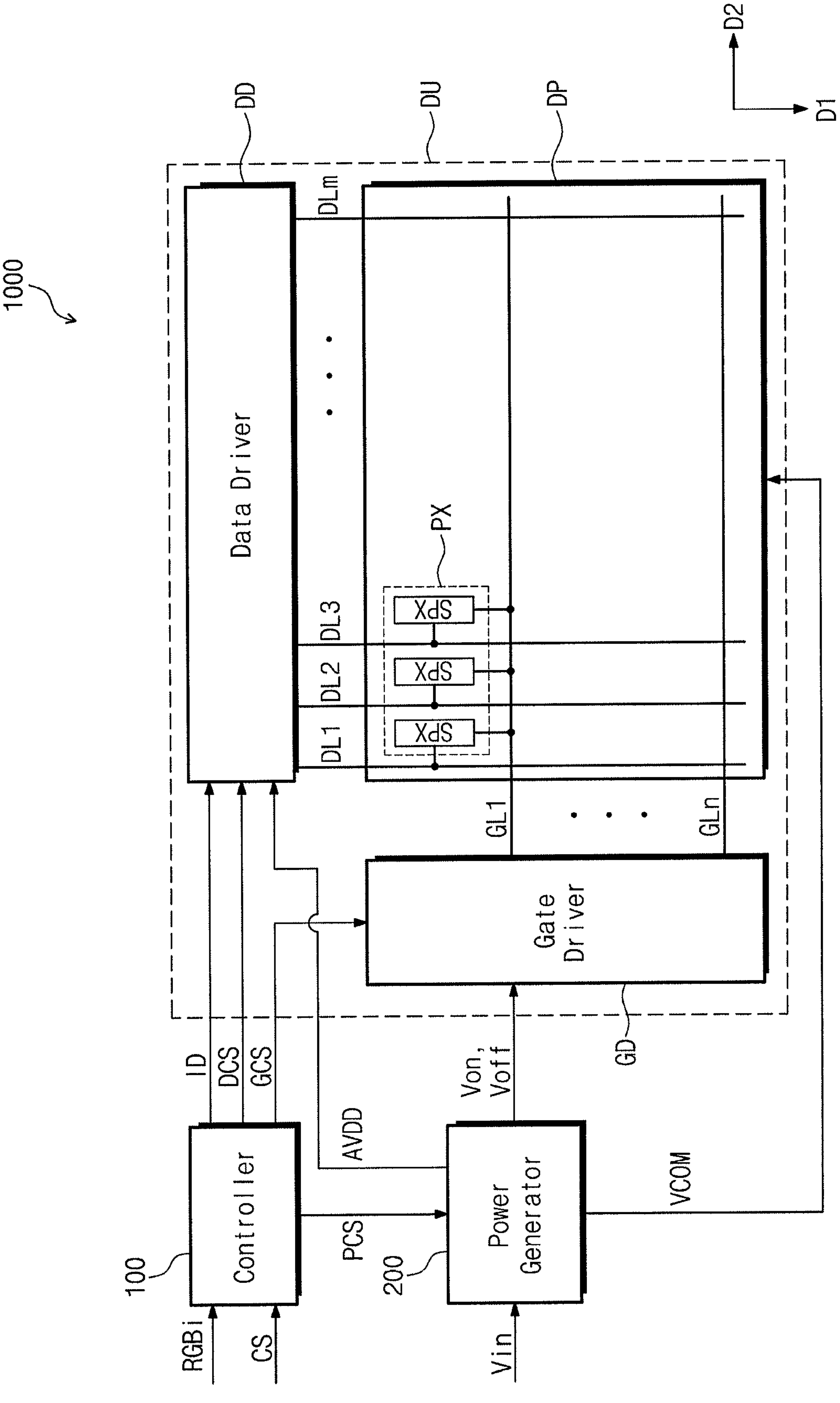
FIG. 1 illustrates an embodiment of a display device.

Example embodiments will be described with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments (or portions thereof) may be combined to form additional embodiments.

In the drawings, the dimensions of layers and regions may be exaggerated for clarity of illustration. It will also be understood that when a layer or element is referred to as being “on” another layer or substrate, it can be directly on the other layer or substrate, or intervening layers may also be present. Further, it will be understood that when a layer is referred to as being “under” another layer, it can be directly under, and one or more intervening layers may also be present. In addition, it will also be understood that when a layer is referred to as being “between” two layers, it can be the only layer between the two layers, or one or more intervening layers may also be present. Like reference numerals refer to like elements throughout.

When an element is referred to as being “connected” or “coupled” to another element, it can be directly connected or coupled to the another element or be indirectly connected or coupled to the another element with one or more intervening elements interposed therebetween. In addition, when an element is referred to as “including” a component, this indicates that the element may further include another component instead of excluding another component unless there is different disclosure.

FIG. 1 illustrates an embodiment of a display device 1000 which includes a display unit DU for displaying an image and a controller 100 for controlling the display unit DU. The display unit DU may include, for example, a display panel DP, and gate driver GD and a data driver DD for driving the display panel DP.

The controller 100 receives an input image signal RGBi and a plurality of control signals CS from an external source. The controller 100 converts a data format of the input image signal RGBi to correspond to, for example, an interface specification of the data driver DD and the structure of the display panel DP. The controller 100 then generates and outputs image data ID to the data driver DD.

Additionally, the controller 100 generates a data control signal DCS (for example, an output start signal, a parallel start signal, etc.) and a gate control signal GCS (for example, a vertical start signal, a vertical clock signal, and a vertical clock bar signal) based on the controls signals CS. The data control signal DCS is provided to the data driver DD and the gate control signal GCS is provided to the gate driver GD.

The gate driver GD outputs the gate signals sequentially based on the gate control signal GCS from the controller 100.

The data driver DD converts the output image data ID to data voltages and outputs the data voltages based on the data control signal DCS from the controller 100. The output data voltages are applied to the display panel DP.

The display panel DP includes a plurality of gate lines GL1 to GLn, a plurality of data lines DL1 to DLm, and a plurality of sub pixels SPX. The first and nth gate lines GL1 and GLn are illustrated in FIG. 1. For illustrative purposes, the first, second, third, and mth data lines DL1, DL2, DL3, and DLm of data lines DL1 to DLm are illustrated.

The gate lines GL1 to GLn extend in a second direction D2 and are arranged in a first direction D1 vertical to the second direction D2. The gate lines GL1 to GLn are connected to the gate driver GD and receive the gate signals from the gate driver GD.

The data lines DL1 to DLm extend in the first direction D1 and are arranged in the second direction D2. The data lines DL1 to DLm are connected to the data driver DD to receive the data voltages from the data driver DD.

The sub pixels SPX are arranged in a matrix along the first and second directions D1 and D2. The sub pixels SPX may emit light of one of a plurality of predetermined colors, e.g., red, green, and blue. In another embodiment, the sub pixels SPX may emit light of other colors, e.g., white, yellow, cyan, magenta, or another color.

A predetermined number of sub pixels SPX that emit light of different colors may form a pixel PX. For example, three sub pixels SPX may form one pixel PX. In another embodiment, two, four, or more sub pixels SPX may form one pixel PX.

The pixel PX emits light for displaying a unit image. The resolution of the display panel DP may be determined based on the number of the pixels PX in the display panel DP. Only one pixel PX is shown in FIG. 1 for illustrative purposes. The pixel PX and remaining pixels may be arranged in a matrix in a first direction D1 and a second direction D2 crossing the first direction D1.

Each sub pixel SPX may be connected to a corresponding one of the gate lines GL1 to GLn and a corresponding one of the data lines DL1 to DLm in order to be driven.

According to an embodiment, the display device 1000 may include a power generator 200 to receive an input power voltage Vin, generate a driving voltage AVDD based on the input power voltage Vin, and supply the driving voltage AVDD to the display unit DU. The driving voltage AVDD may be supplied, for example, to a gamma voltage generation unit of the data driver DD. The input power voltage Vin may be supplied, for example, from an external power source.

According to an embodiment, the power generator 200 may generate a gate-on voltage Von and a gate-off voltage Voff based on the driving voltage AVDD. The gate-on voltage Von and the gate-off voltage Voff are supplied to the gate driver GD. The gate driver GD may generate a gate signal applied to the gate lines GL1 to GLn based on the gate-on voltage Von and the gate-off voltage Voff.

According to an embodiment, the power generator 200 may generate a common voltage Vcom based on the driving voltage AVDD. The common voltage Vcom may be supplied to the display panel DP. The common voltage Vcom may be supplied, for example, to a common electrode at the display panel DP, for example, in full measure. In one embodiment, the power generator 200 may directly supply the driving voltage AVDD to the gate driver GD or the display panel DP.

According to one embodiment, controller 100 may control the power generator 200. For example, the controller 100 generates a power control signal PCS and outputs the power control signal PCS to the power generator 200. The power generator 200 may selectively output the driving voltage AVDD, the gate-on voltage Von, the gate-off voltage Voff, and the common voltage Vcom based on the power control signal PCS.

According to one embodiment, when the display device 1000 is turned off (e.g., by a user), the controller 100 may instruct the power generator 200 to be turned off through the power control signal PCS. As a result, power to the display unit DU may be cut off.

According to one embodiment, when the display device 1000 malfunctions due to electrical interference (e.g., static electricity or physical impact), the controller 100 may instruct the power generator 200 to be turned off through the power control signal PCS. As a result, power to the display unit DU may be cut off. The turned-off power generator 200 may be reset and operate normally again.

Figure 2:
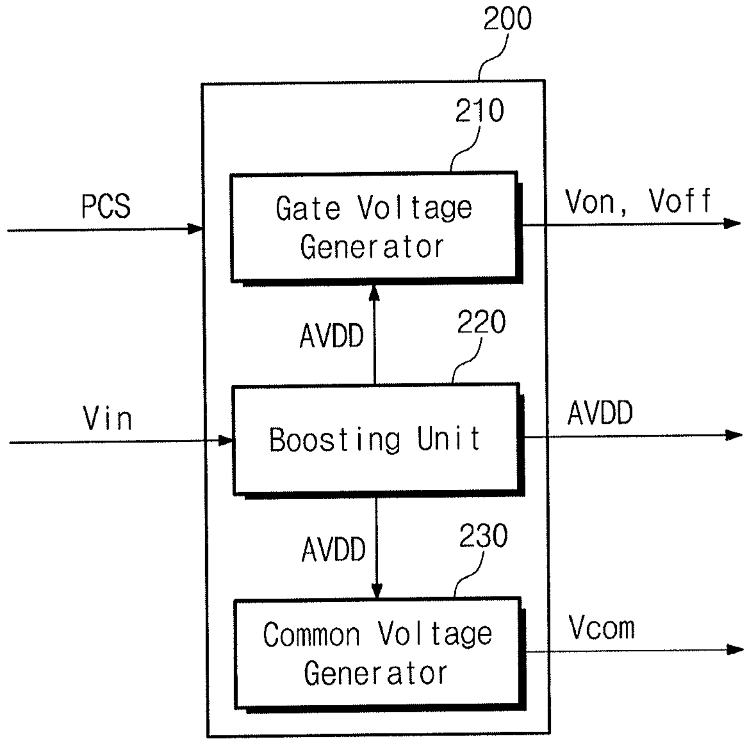
FIG. 2 illustrates an embodiment of a power generator.

FIG. 2 illustrates an embodiment of a power generator, which, for example, may correspond to power generator 200 in FIG. 1. Referring to FIG. 2, power generator 200 may include a gate voltage generator 210, a boosting unit 200, and a common voltage generator 230. The boosting unit 210 may receive the input power voltage Vin and generate the driving voltage AVDD by boosting the input power voltage Vin. According to an embodiment, the driving voltage AVDD may be a voltage having a greater level than the input power voltage Vin.

The gate voltage generator 210 may receive the driving voltage AVDD from the boosting unit 210 and generate the gate-on voltage Von and the gate-off voltage Voff based on the driving voltage AVDD. According to an embodiment, the gate-on voltage Von may be greater than a turn-on voltage of a pixel transistor of the sub pixel SPX (e.g., see FIG. 1). The gate-off voltage Voff may be less than a turn-off voltage of the pixel transistor.

The common voltage generator 230 may receive the driving voltage AVDD from the boosting unit 210 and generate the common voltage Vcom based on the driving voltage AVDD. According to an embodiment, the common voltage generator 230 may include an OP-AMP. The OP-AMP may receive the driving voltage AVDD and generate the common voltage Vcom by using the driving voltage AVDD as power.

Figure 3:
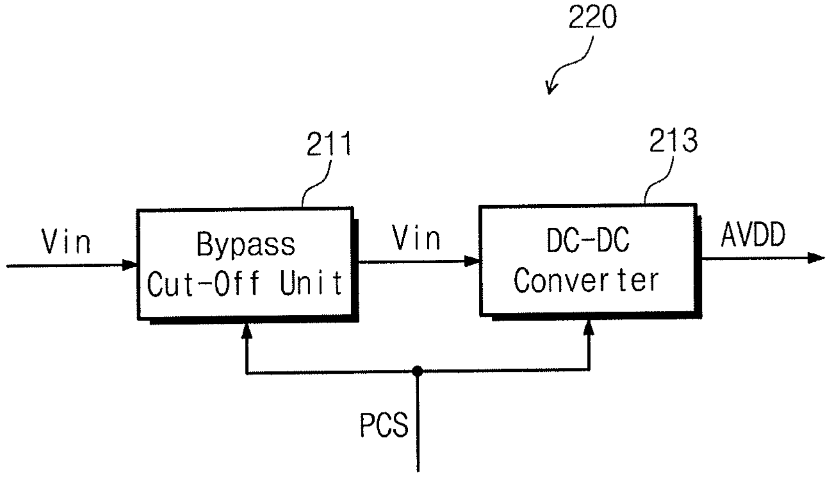
FIG. 3 illustrates an embodiment of a boosting unit.
Figure 4:
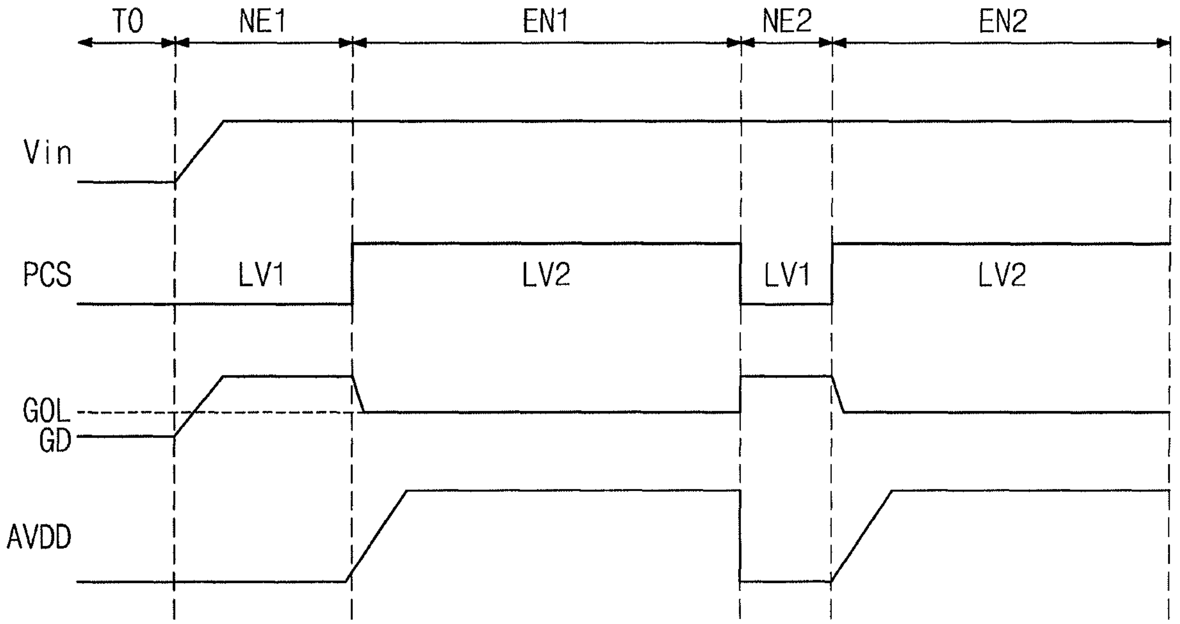
FIG. 4 illustrates an embodiment for operating the boosting unit.

FIG. 3 illustrates an embodiment of a boosting unit, which, for example, may corresponding to boosting unit 220 in FIG. 2. FIG. 4 is an embodiment of a timing diagram for operating the boosting unit in FIG. 3.

Referring to FIG. 3, the boosting unit 210 may include a bypass cut-off unit 211 and a DC-DC converter 213. According to an embodiment, the bypass cut-off unit 211 may receive the input power voltage Vin and the power control signal PCS. The bypass cut-off unit 211 may selectively cut-off supply of the input power voltage Vin provided to the DC-DC converter 213 based on the power control signal PCS. The DC-DC converter 213 may receive the power control signal PCS and the input power voltage Vin from the bypass cut-off unit 211, and may selectively boost the input power voltage Vin based on the power control signal PCS.

Referring to FIG. 4, an active section and an inactive section may be determined according to a level of the power control signal PCS. An example of a first active section EN1 and a second active section EN2 in the active section and a first inactive section NE1 and a second inactive section NE2 in the inactive section are illustrated in FIG. 4.

According to an embodiment, the power control signal PCS may include a first logic level LV1 and a second logic level LV2 in the inactive section and the active section, respectively. In the inactive section, the gate voltage generator 210 and the common voltage generator 230 of the power generator 200 may be turned off based on the power control signal PCS having the first logic level LV1 and the gate-on voltage Von, the gate-off voltage Voff, and the common voltage Vcom may not be generated.

In the inactive section, the bypass cut-off unit 211 may cut off the input power voltage Vin based on the first logic level LV1 of the power control signal PCS. In the inactive section, the DC-DC converter 213 may generate the driving voltage AVDD to hold boosting and allow the driving voltage AVDD to have an off level based on the first logic level LV1 of the power control signal PCS. According to an embodiment, the off level may, for example, be lower than a shut down voltage of the OP-AMP, e.g., the level of a ground voltage.

In the active section, the bypass cut-off unit 211 may supply the input power voltage Vin to the DC-DC converter 213 based on the second logic level LV2 of the power control signal PCS. In the active section, to boost the input power voltage Vin based on the second logic level LV2 of the power control signal PCS, the DC-DC converter 213 may generate the driving voltage AVDD to allow the driving voltage AVDD to have a greater level than the input power voltage Vin.

Figure 5:
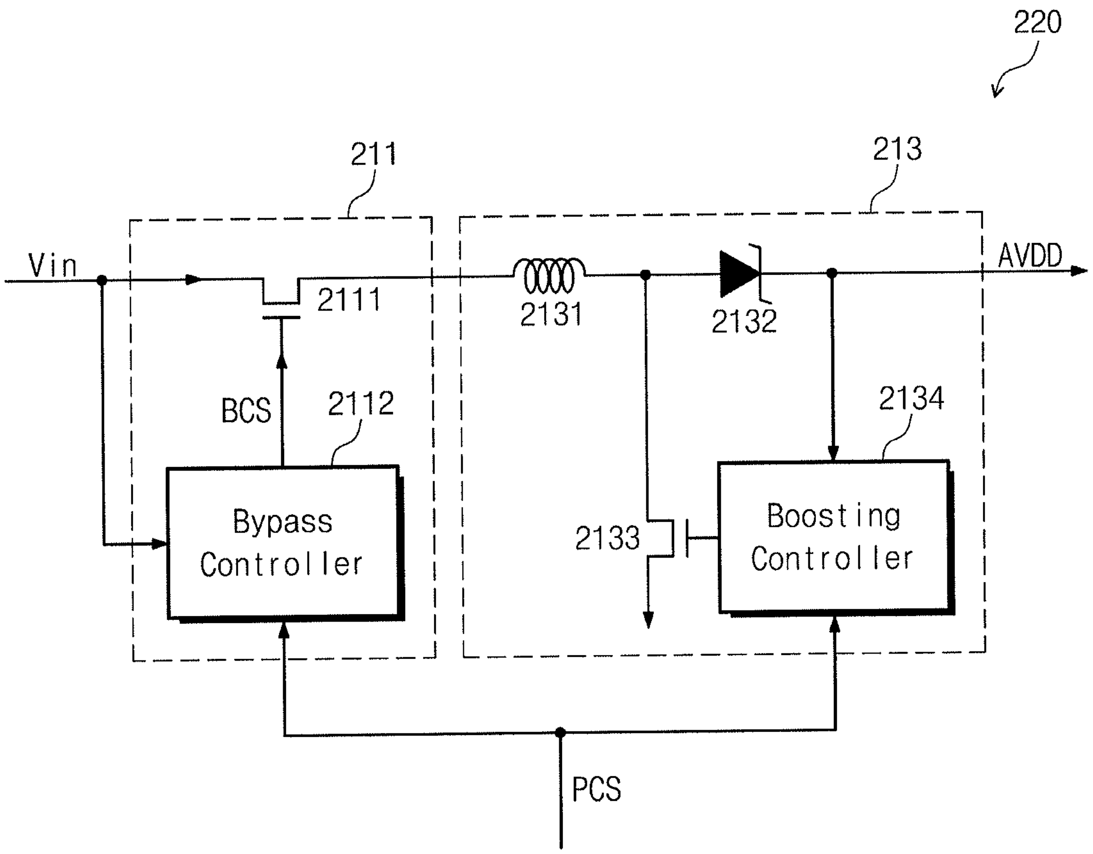
FIG. 5 illustrates another embodiment of a boosting unit.

FIG. 5 illustrates another embodiment of the boosting unit 220 which includes the bypass cut-off unit 211 and the bypass controller 2112. In this embodiment, the bypass cut-off unit 211 includes a bypass cut-off transistor 2111.

The bypass cut-off transistor 2111 may be, for example, a p-channel metal oxide semiconductor (PMOS). In another embodiment, the bypass cut-off transistor 2111 may be an n-channel metal oxide semiconductor (NMOS) or another switching device. The input terminal of the bypass cut-off transistor 2111 may receive the input power voltage Vin. The output terminal of the bypass cut-off transistor 2111 may be connected to the DC-DC converter 213. The control terminal of the bypass cut-off transistor 2111 may be connected to the bypass controller 2112.

The bypass controller 2112 may receive the input power voltage Vin and the power control signal PCS and generate a cut-off control signal BCS based on the power control signal PCS. The bypass controller 2112 outputs the cut-off control signal BCS to the control terminal of the bypass cut-off transistor 2111.

According to an embodiment, the DC-DC converter 213 may include an inductor 2131, a diode 2132, a switching transistor 2133, and a boosting controller 2134. The first terminal of the inductor 2131 may be connected in series to the output terminal of the bypass cut-off transistor 2111. The first terminal of the diode 2132 may be connected to the second terminal of the inductor 2131.

The input terminal of the switching transistor 2133 may be grounded. The control terminal of the switching transistor 2133 may be connected to the boosting controller 2134. The output terminal of the switching transistor 2133 may be connected to the second terminal of the inductor 2131.

The boosting controller 2134 may control the switching transistor 2133 based on the power control signal PCS. For example, the boosting controller 2134 may generate a pulse based on the power control signal PCS for output to the control terminal of the switching transistor 2133. The boosting controller 2134 may be connected to the second terminal of the diode 2132 to receive the driving voltage AVDD and may generate the pulse based on the received driving voltage AVDD.

FIGS. 4 and 5 illustrate operation of the boosting unit 220. In a turn-off section TO, the display device 1000 (e.g., see FIG. 1) is in a turn-off state. In the turn-off section TO, the input power voltage Vin is not input yet. When the display device 1000 is turned on, in the first inactive section NE1, the input power voltage Vin may be supplied to the bypass cut-off transistor 2111 and the bypass controller 2112.

In the first inactive section NE1, the power control signal PCS has a first logic level LV1. Based on the power control signal PCS of the first logic level LV1, the bypass controller 2112 generates the input poser voltage Vin as the cut-off control signal BCS, and outputs the input power voltage Vin to the control terminal of the bypass cut-off transistor 2111. Since the input power voltage Vin is applied to the input terminal and the control terminal of the bypass cut-off transistor 2111, the bypass cut-off transistor 2111 is turned off. As a result, the bypass cut-off unit 211 may cut off the input power voltage Vin supplied to the DC-DC converter 213.

In the first inactive section NEN, based on the power control signal PCS of the first logic level LV1, the boosting controller 2134 holds the boosting operation and generates a voltage with an off level output to the second terminal of the inductor 2131. Accordingly, the output voltage may be output as the driving voltage AVDD through the second terminal of the diode 2132. According to an embodiment, the boosting controller 2134 may directly output the output voltage with an off level to the second terminal of the diode 2132.

In the first active section EN1, the power control signal PCS has the second logic level LV2. Based on the power control signal PCS of the second logic level LV2, the bypass controller 2112 may generate the cut-off control signal BCS having a gate-on level GOL for turning on the bypass cut-off transistor 2111. According to an embodiment, the gate-on level GOL may be less than a level of the input power voltage Vin. The bypass controller 2112, for example, may drop down a level of the input power voltage Vin to generate the gate-on level GOL. The bypass controller 2112 applies the cut-off control signal BCS with a gate-on level GOL to the control terminal of the bypass cut-off transistor 2111. As a result, the bypass cut-off transistor 2111 is turned on and the output terminal of the bypass cut-off transistor 2111 outputs the input power voltage Vin to the inductor 2131.

In the first active section EN1, the boosting controller 2134 starts boosting on the input power voltage Vin by generating a pulse based on the power control signal PCS of a second logic level LV2. When the switching transistor 2133 is turned on by the pulse, a current path is formed between the second terminal of the inductor 2131 and the ground. Accordingly, the size of current flowing through the inductor 2131 is increased and an energy according to the size of current is stored in the inductor 2131. Then, when the switching transistor 2133 is turned off by the pulse, a current path between the second terminal of the inductor 2131 and the ground is cut off and a current flowing through the inductor 2131 is cut off. Accordingly, counter electromotive force is generated in the inductor 2131. The driving voltage AVDD may be output through the diode 2132 by a high voltage of counter electromotive force generated as a process for turning on/off the switching transistor 2133 is repeated.

When the power generator 200 (e.g., see FIG. 1) or the display unit DU (e.g., see FIG. 1) malfunctions by electrical interference (e.g., static electricity or physical impact), in order to reset the power generator 200 or the display unit DU, during a second inactive section NE2, the controller 100 (see FIG. 1) outputs the power control signal PCS of the first logic level LV1.

In the second inactive section NE2, since the input power voltage Vin is maintained but the power control signal PCS has a first logic level LV1, similar to the first inactive section NE1, the bypass cut-off unit 211 cuts off the input power voltage Vin so that it is not supplied to the DC-DC converter 213 and the DC-DC converter 213 does not perform boosting and outputs the driving voltage AVDD with an off level.

Accordingly, when the power generator 200 is turned off, a circuit in the power generator 200 and including an OP-AMP (for example, the common voltage generator 230, e.g., see FIG. 2) may be shut down. Accordingly, when the OP-AMP malfunctions, driving stability may be improved by effectively resetting the malfunctioning OP-AMP. Additionally, power consumption and heat generation due to the malfunctioning OP-AMP may be prevented.

The power control signal PCS may have the second logic level LV2 in a second active section EN2. Accordingly, similar to the first active section EN2, the bypass cut-off unit 211 supplies the input power voltage Vin to the DC-DC converter 213, and the DC-DC converter 213 generates the driving voltage AVDD by boosting the input power voltage Vin.

The bypass controller 2112 is described above as being separated from and implemented separately from the DC-DC converter 213. In one embodiment, the bypass controller 2112 may be implemented as a circuit inside the DC-DC converter 213 or may be implemented as a circuit outside the boosting unit 210.

Figure 6:
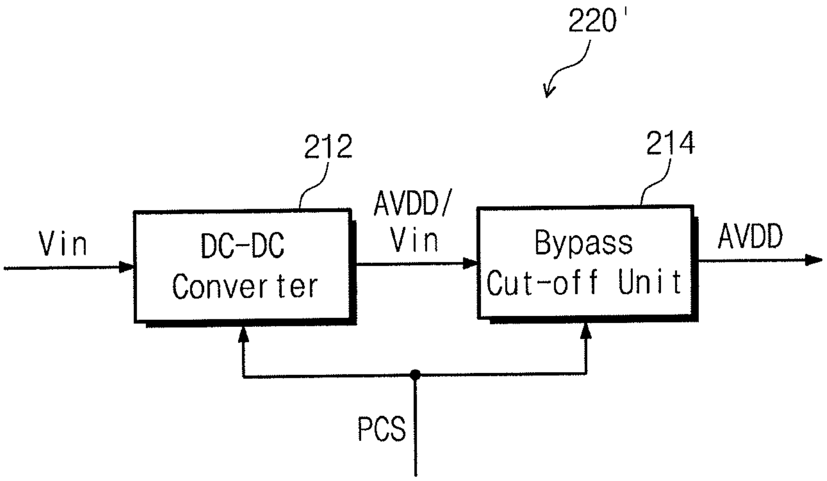
FIG. 6 illustrates another embodiment of a boosting unit.

FIG. 6 illustrates another embodiment of a boosting unit 210' which includes a bypass cut-off unit 214 and a DC-DC converter 212. In FIG. 6, the boosting unit 210' may be the same as the boosting unit 210 in FIG. 3, except that the arrangement order of the bypass cut-off unit 213 and the DC-DC converter 212 is different.

According to an embodiment, the DC-DC converter 212 may receive the input power voltage Vin and the power control signal PCS and selectively boost the input power voltage Vin based on the power control signal PCS.

The bypass cut-off unit 214 may receive the input power voltage Vin and the power control signal PCS. The bypass cut-off unit 214 may selectively output or cut off the driving voltage AVDD and the input power voltage Vin output from the DC-DC converter 212 based on the power control signal PCS. The driving voltage AVDD, for example, may be output to the common voltage generator 230 (e.g., see FIG. 2).

In the inactive section, the DC-DC converter 212 may hold boosting and output the input power voltage Vin based on the first logic level LV1 (e.g., see FIG. 4) of the power control signal PCS. In the inactive section, the bypass cut-off unit 214 may cut off the output of the input power voltage Vin based on the first logic level LV1 of the power control signal PCS.

In the active section, in boosting the input power voltage Vin based on the second logic level LV2 (e.g., see FIG. 4) of the power control signal PCS, the DC-DC converter 212 may generate the driving voltage AVDD to allow the driving voltage AVDD to have a greater level than the input power voltage Vin. In the active section, the bypass cut-off unit 214 may output the driving voltage AVDD based on the second logic level LV2 of the power control signal PCS.

Figure 7:
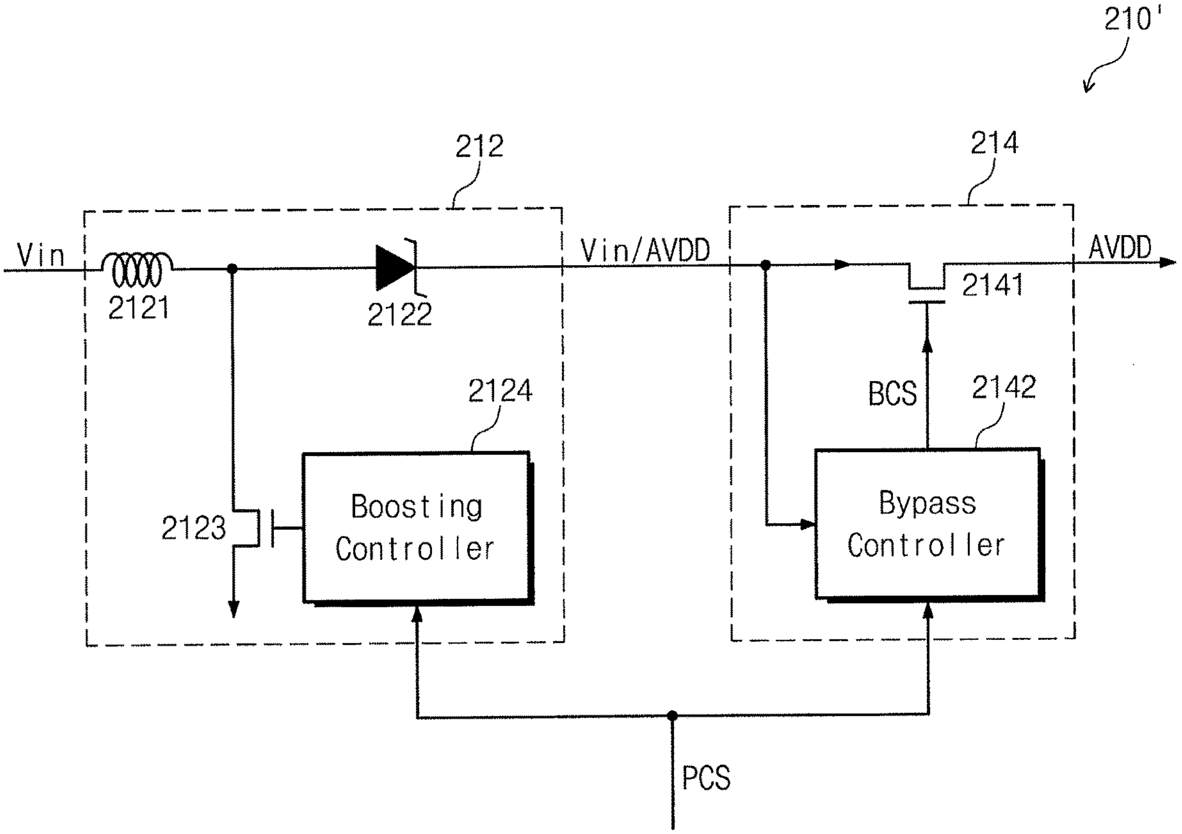
FIG. 7 illustrates another embodiment of a boosting unit.

FIG. 7 illustrates another embodiment of the boosting unit 220', which, for example, may be a more detailed version of the embodiment in FIG. 6. Referring to FIG. 7, the DC-DC converter 212 may include an inductor 2121, a diode 2122, a switching transistor 2123, and a boosting controller 2124. The first terminal of the inductor 2121 may receive the input power voltage Vin. The first terminal of the diode 2122 may be connected to the second terminal of the inductor 2121.

The input terminal of the switching transistor 2123 may be grounded. The control terminal of the switching transistor 2123 may be connected to the boosting controller 2124. The output terminal of the switching transistor 2123 may be connected to the second terminal of the inductor 2121.

The boosting controller 2124 may control the switching transistor 2123 based on the power control signal PCS. For example, the boosting controller 2124 may generate a pulse based on the power control signal PCS for output to the control terminal of the switching transistor 2123. The boosting controller 2124 may be connected to the second terminal of the diode 2122 to pass the driving voltage AVDD.

According to an embodiment, the bypass cut-off unit 214 may include a bypass cut-off transistor 2141 and a bypass controller 2142. The input terminal of the bypass cut-off transistor 2141 may receive the driving voltage AVDD or the input power voltage Vin from the second terminal of the diode 2122. The control terminal of the bypass cut-off transistor 2111 may be connected to the bypass controller 2112. The bypass controller 2112 outputs the cut-off control signal BCS to the control terminal of the bypass cut-off transistor 2141.

In the active section, the boosting controller 2124 starts boosting the input power voltage Vin by generating a pulse based on the power control signal PCS with a second logic level LV2 (e.g., see FIG. 4) and generates the driving voltage AVDD. The driving voltage AVDD is output to the input terminal of bypass cut-off transistor 2141.

In the active section, the driving voltage AVDD may be supplied to the bypass cut-off transistor 2141 and the bypass controller 2142. Based on the power control signal PCS of the second logic level LV2, the bypass controller 2142 may generate the cut-off control signal BCS having a gate-on level. According to an embodiment, the gate-on level may be less than a level of the driving voltage AVDD. The bypass controller 2142, for example, may drop down a level of the driving voltage AVDD to generate the gate-on level. The bypass controller 2142 applies the cut-off control signal BCS with a gate-on level to the control terminal of the bypass cut-off transistor 2141. As a result, the bypass cut-off transistor 2141 is turned on and the output terminal of the bypass cut-off transistor 2141 outputs the driving voltage AVDD.

When the power generator 200 (e.g., see FIG. 1) or the display unit DU (e.g., see FIG. 1) malfunctions by electrical interference (e.g., static electricity or physical impact), in order to reset the power generator 200 or the display unit DU, the controller 100 (e.g., see FIG. 1) outputs the power control signal PCS of the first logic level LV1 during an inactive section.

In the inactive section, the boosting controller 2124 may hold boosting based on the power control signal PCS of the first logic level LV1.

According to an embodiment, the DC-DC converter 212 may output the input power voltage Vin. For example, the boosting controller 2124 may turn off the switching transistor 2123 based on the power control signal PCS having the first logic level LV1. Accordingly, a current path passing through the inductor 2121 and the diode 2122 is formed and the input power voltage Vin may be output (or by-passed) through the output terminal of the diode 2122.

In the inactive section, the input power voltage Vin may be supplied to the bypass cut-off transistor 2141 and the bypass controller 2142. Based on the power control signal PCS of the first logic level LV1, the bypass controller 2142 generates the input voltage Vin as the cut-off control signal BCS, and outputs the cut-off control signal BCS to the control terminal of the bypass cut-off transistor 2141. Since the input power voltage Vin is applied to the input terminal and the control terminal of the bypass cut-off transistor 2141, the bypass cut-off transistor 2141 is turned off. As a result, the bypass cut-off unit 214 may cut off the output of the input power voltage Vin.

Accordingly, when the power generator 200 is turned off, a circuit in the power generator 200 and including an OP-AMP (for example, the common voltage generator 230, e.g., see FIG. 2) may be shut down. Accordingly, when the OP-AMP malfunctions, the malfunctioning OP-AMP may be reset effectively, and power consumption and heat generation by the malfunctioning OP-AMP may be prevented.

In accordance with one or more of the aforementioned embodiments, a bypass cut-off unit may cut off an input voltage to a DC-DC converter based on a power control signal. Turing off a power generator may result in turning off a circuit in a common voltage generator. As a result, when the circuit malfunctions, the malfunctioning circuit may be reset effectively, and power consumption and heat generation by the malfunctioning circuit may be prevented.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The controllers, drivers, converters, and other processing features of the embodiments described herein may be implemented in logic which, for example, may include hardware, software, or both. When implemented at least partially in hardware, the controllers, drivers, converters, and other processing features may be, for example, any of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, drivers, converters, and other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods herein.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:

a display to display an image;

a power generator to supply a driving voltage to the display; and a controller to control the display and the power generator and generate a power control signal, wherein the power generator includes:

a DC-DC converter to receive an input power voltage and the power control signal and boost the input power voltage during an active section based on the power control signal to generate the driving voltage, and output the input power voltage during an inactive section;

a common voltage generator comprising an OP-AMP to receive the driving voltage and convert the driving voltage into a common voltage; and bypass cut-off logic to cut off a supply of the input power voltage provided to the common voltage generator based on the power control signal to reset the OP-AMP.

2. The display device as claimed in claim 1, wherein the bypass cut-off logic is to supply the driving voltage to the common voltage generator in the active section.

3. The display device as claimed in claim 2, wherein:

the power control signal has a first logic level during the inactive section;

the DC-DC converter is to hold boosting and output the input power voltage based on the first logic level;

the bypass cut-off logic is to cut off supply of the input power voltage based on the first logic level;

the common voltage generator is to be turned off based on the first logic level;

the power control signal has a second logic level during the active section;

the DC-DC converter is to boost based on the second logic level;

the bypass cut-off logic is to supply driving power voltage based on the second logic level; and the common voltage generator is to be turned on based on the second logic level.

4. The display device as claimed in claim 2, wherein the bypass cut-off logic includes:

a bypass controller to receive the power control signal and the input power voltage and generate a cut-off control signal based on the power control signal; and a bypass cut-off transistor including an input terminal coupled to the DC-DC converter and a control terminal to receive the cut-off control signal, the bypass cut-off transistor is to cut off supply of the input power voltage or supply the driving voltage based on the cut-off control signal.

5. The display device as claimed in claim 4, wherein:

the DC-DC converter includes an inductor having a first terminal to receive the input power voltage, a diode having a first terminal connected to a second terminal of the inductor, a switching transistor connected to the second terminal of the inductor, and a boosting controller to control the switching transistor, the input terminal of the bypass cut-off transistor is coupled to a second terminal of the diode, and the boosting controller is to generate a pulse based on the power control signal in the active section to output the pulse to a control terminal of the switching transistor.

6. The display device as claimed in claim 5, wherein the boosting controller is to turn off the switching transistor in the inactive section.

* * * * *